United States Patent
Raymond (10) Patent No.: US 12,167,503 B2
(45) Date of Patent: *Dec. 10, 2024

(54) INTELLIGENT MOBILITY IN COMMUNICATION NETWORKS

(71) Applicant: DISH Wireless L.L.C., Englewood, CO (US)

(72) Inventor: Paul-Andre Raymond, Reston, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,594

(22) Filed: Sep. 8, 2023

(65) Prior Publication Data

US 2023/0422128 A1    Dec. 28, 2023

Related U.S. Application Data

(63) Continuation of application No. 17/206,749, filed on Mar. 19, 2021, now Pat. No. 11,792,707.

(51) Int. Cl.
*H04W 8/24* (2009.01)
*H04W 36/00* (2009.01)
(Continued)

(52) U.S. Cl.
CPC ......... *H04W 8/24* (2013.01); *H04W 36/0072* (2013.01); *H04W 36/304* (2023.05); *H04W 36/324* (2023.05)

(58) Field of Classification Search
CPC ... H04W 36/30; H04W 8/24; H04W 36/0072; H04W 36/32; H04W 36/324; H04W 36/304; H04W 36/00; H04W 16/02; H04W 16/18; H04W 72/04; H04W 72/02; H04W 16/10; H04W 28/24; H04W 72/542
(Continued)

(56) References Cited

U.S. PATENT DOCUMENTS 6,721,567 B1    4/2004    Wang et al.
2002/0068571 A1    6/2002    Ohlsson et al.
(Continued)

FOREIGN PATENT DOCUMENTS

EP    1340398 A2    9/2003
EP    2768256 A1    8/2014
(Continued)

OTHER PUBLICATIONS

International Search Report and Written Opinion, mailed Jul. 1, 2022, for International Patent Application No. PCT/US2022/020805. (15 pages).

*Primary Examiner* — Charles N Appiah
*Assistant Examiner* — Frank E Donado
(74) *Attorney, Agent, or Firm* — Seed IP Law Group LLP (57) ABSTRACT

Embodiments are directed towards facilitating intelligent mobility including session and handover management within communications networks. Handovers for user devices in a network are predicted, current and predicted status data of the network are obtained, and a tradeoff between a cost for pre-allocation of resources prior to predicted handovers and a gain in quality of service is analyzed based on the current and predicted status data to cause resource pre-allocation in the network.

20 Claims, 9 Drawing Sheets

(51) Int. Cl.
*H04W 36/30* (2009.01)
*H04W 36/32* (2009.01)

(58) Field of Classification Search
USPC .......................................................... 455/464
See application file for complete search history.

(56) References Cited

U.S. PATENT DOCUMENTS

| | | | |
|---|---|---|---|
| 2004/0266474 A1* | 12/2004 | Petrus | H04B 17/382 |
| | | | 455/524 |
| 2011/0294539 A1* | 12/2011 | Shin | H04W 48/18 |
| | | | 455/552.1 |
| 2014/0099963 A1 | 4/2014 | Tompson et al. | |
| 2016/0050589 A1 | 2/2016 | Safavi | |
| 2016/0323934 A9 | 11/2016 | Beninghaus et al. | |
| 2016/0366623 A1* | 12/2016 | Senarath | H04W 36/00838 |
| 2016/0380820 A1 | 12/2016 | Horvitz et al. | |
| 2019/0053107 A1* | 2/2019 | Fu | H04W 36/0033 |
| 2020/0053618 A1 | 2/2020 | Aso et al. | |
| 2023/0247512 A1* | 8/2023 | Hévizi | H04W 36/322 |
| | | | 370/331 |

FOREIGN PATENT DOCUMENTS

| | | | |
|---|---|---|---|
| EP | 2891360 A1 | 7/2015 | |
| EP | 3216269 A1 | 9/2017 | |

* cited by examiner

INTELLIGENT MOBILITY IN COMMUNICATION NETWORKS

This United States patent application is a continuation of U.S. patent application Ser. No. 17/206,749 filed on Mar. 19, 2021 and entitled "INTELLIGENT MOBILITY IN COMMUNICATION NETWORKS", which is hereby incorporated by reference in its entirety.

TECHNICAL FIELD

The present disclosure relates generally to digital wireless communications and, more particularly, to facilitating intelligent mobility including session and handover management within a 5G communications network.

BACKGROUND

Description of the Related Art

Mobile devices are being used to handle an increasing variety of tasks by more and more users. 3GPP based mobile networks have typically implemented some sophisticated solutions to maintain session while a mobile device is handed over from cell to cell. The advent and implementation of 5G technology has resulted in faster speeds and increased bandwidth, which typically needs more cells in the network. Among other things, mobile edge computing in a macro cell, micro cell, and/or pico cell environment presents new challenges and calls for technological solutions.

BRIEF SUMMARY

Briefly described, embodiments of the presently disclosed technology are directed toward systems and methods for facilitating intelligent mobility of user devices in communication networks, e.g., to ensure session continuity in a 5G mobile system. Illustratively, a new "Intelligent Mobility Element" (IME) can be introduced in the communication network that functions to avoid gaps in sessions for user devices and applications when performing handovers between cell sites, by anticipating possible handovers and preparing new connections based on dynamic pre-allocation decisions informed at least in part by machine learning models or other artificial intelligence (AI) techniques.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects. The following list includes certain acronyms used herein:

3GPP: Third Generation Partnership Project.
5G: Fifth Generation.
AMF: Access and Mobility Management Function (as defined in 3GPP 5G core specifications).
API: Application Programming Interface.
AS: Application Server.
CU: Central Unit (as defined in 3GPP 5G RAN specifications).
DU: Distributed Unit (as defined in 3GPP 5G RAN specifications).
ETSI: European Telecommunications Standard Institute.
IP: Internet Protocol.
MEC: Multi-Access Edge Computing.
NEF: Network Exposure Function (as defined in 3GPP core specifications).
NWDAF: Network Data Analytics Function (a network component defined by 3GPP).
ORAN: Open RAN.
PDU: Protocol Data Unit.
RAN: Radio Access Network.
RIC: RAN Intelligent Controller (as defined by the ORAN alliance).
RU: Remote Unit (as defined in 3GPP 5G RAN specifications).

SMF: Session Management Function (as defined in 3GPP 5G core specifications).

UDR: User Data Repository (as defined in 3GPP 5G Core specifications).

UE: User Equipment (e.g., cell phone, smart phone, IoT device, or other devices connected to a communication network).

UPF: User Plane Function (as defined in 3GPP 5G specifications).

URLLC: Ultra Reliable Low Latency Communication (as defined in 3GPP specification).

IME: Intelligent Mobility Element.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

3GPP based mobile networks have implemented certain techniques to maintain session while a UE was handed over from cell to cell. These handovers are generally more efficient when most serving elements are maintained before and after the handovers. In a 5G network, the handovers with some worst handover performance are those where the UPF needs to be changed (i.e. when the target cell cannot be served by the UPF that was serving the source cell).

In a traditional macro cell network, a UPF would serve a large geographical area. To help maintain UPF sessions, the UPF serving areas could be engineered to make handover crossings rare. However, with the emergence of low latency applications and the transition towards edge computing, the UPF coverage area can become much smaller; in some instances, it could be as small as a single cell (e.g., UPF at cell site or 5G in a box). In that case every handover crosses a UPF serving area boundary and needs to include a UPF handover.

Further, the driver for edge computing is having low latency access to an application. For low latency, it is not enough for the UPF to be close to the UE (e.g., at the cell site); having the application server to be close to the UE (e.g., co-located with the UPF) is also important. If the serving UPF changes, the serving application server should change too. Accordingly, maintaining the application session presents another challenge.

As an example, traditionally when a smartphone or any mobile device needs to connect to a data network (for instance to access a website on the Internet), it needs first to establish a PDU session. Part of the PDU session establishment involves assigning a serving UPF and an IP address on the Internet. Packets from the Internet to the mobile device are sent to that specific IP address and the Internet routes the packets to the serving UPF who receives them on behalf of the mobile device. The traditional approach involves selecting a new UPF anchor when the mobile device moves outside of the area that the current UPF can serve. This typically implies a change of IP address, the session may be interrupted for many seconds and many packets could be lost.

There are three Session and Service Continuity (SSC) modes defined by 3GPP, (SSC mode 1, SSC mode 2, SSC mode 3), which are reactive (the handover happens after the need for it was detected) and consequently each has a negative impact on session continuity. As described herein, a novel, make-before-break approach to session handover can significantly improve the 3GPP functions. For example, the approach can include a relocation of the IP address by utilizing advances in IP address management, a relocation of the application session that is based on cloud native principles, and a predictive component that anticipates the handover before it happens based on machine learning and innovative APIs at the cell site.

For edge applications, when the application runs close to the cell site, and in particular applications that depend on low latency, the 3GPP session handover is required but not sufficient. The presently disclosed technology also enables handover of the application sessions (and the application platform session, in some cases) to improve quality of service or other performance of the communications network.

Figure 1:
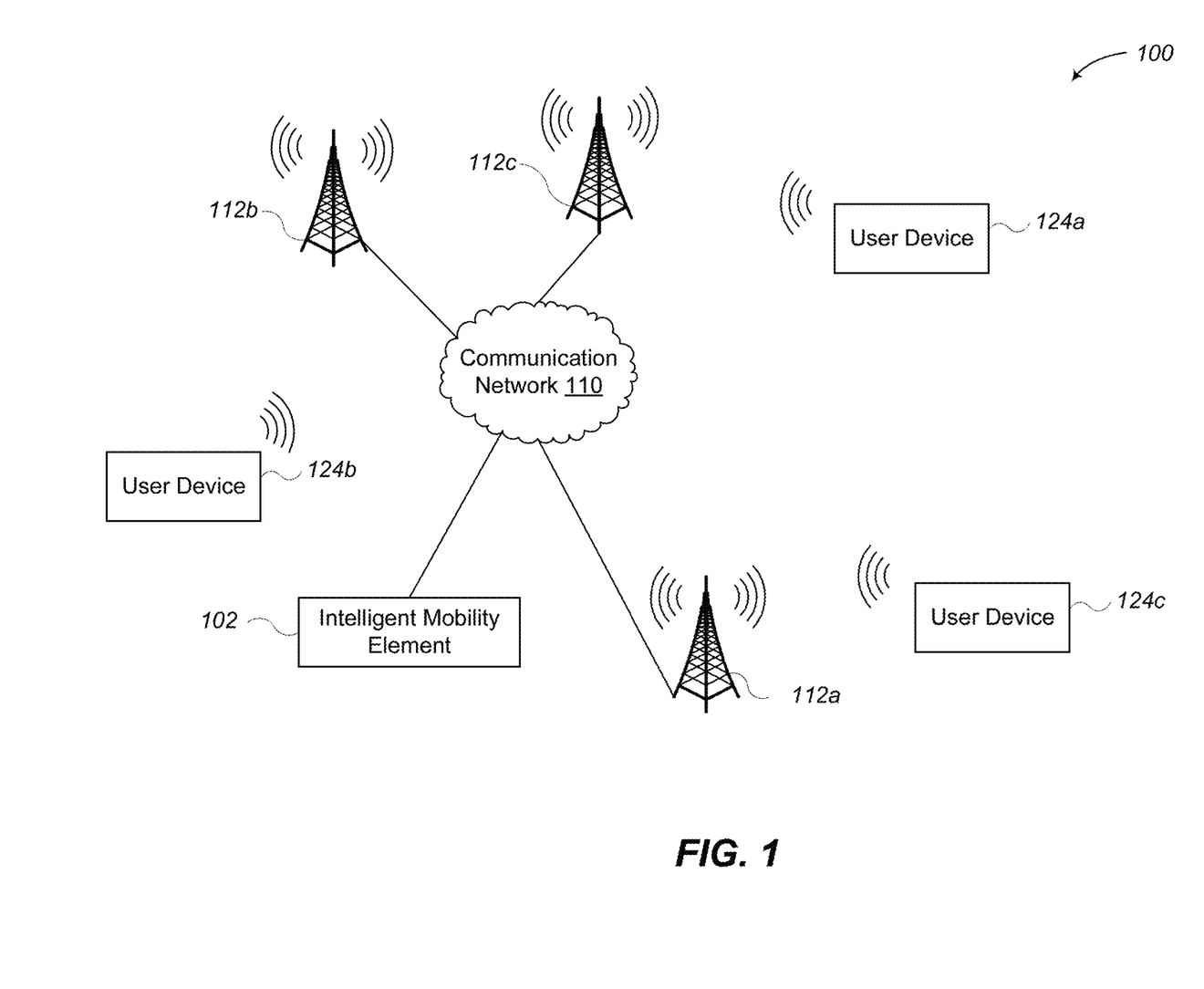
FIG. 1 illustrates a context diagram of an environment for intelligent mobility management in a 5G communications network in accordance with embodiments described herein.

FIG. 1 illustrates a context diagram of an environment 100 for intelligent mobility management in a 5G communications network in accordance with embodiments described herein. Environment 100 includes a plurality of cells 112a-112c, a plurality of user devices 124a-124b, an Intelligent Mobility Element (IME) 102, and a communication network 110. Illustratively, the cells 112a-112c correspond to cell sites (e.g., cellular towers) that together implement a 5G cellular communications network. The cells 112a-112c may include or be in communication with base stations, radio back haul equipment, antennas, or other devices, which are not illustrated for ease of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication network 110. Communication network 110 includes one or more wired or wireless networks, which may include a series of smaller or private connected networks that carry information between the cells 112a-112c.

The user devices 124a-124c are computing devices that receive and transmit cellular communication messages with the cells 112a-112c, e.g., via antennas or other means. Examples of user devices 124a-124c may include, but are not limited to, mobile devices, smartphones, tablets, cellular-enabled laptop computers, or other UE or computing devices that can communicate with a 5G cellular network.

In various embodiments, the IME 102 can include one or more computing devices for performing the intelligent mobility functions described herein. The IME 102 can interface or otherwise communicate with multiple elements (e.g., AS, AMF, CU, DU, RU, Data Lake, SMF, UDR, UPF, UE) via the communication network 110. Some of those interfaces may be standard (e.g. the interface to the RAN could leverage ETSI MEC interfaces). The interface to the core elements may be direct or they may leverage the NEF or an external API gateway. The IME 102 can also interface or otherwise communicate with systems or devices external to the communication network 110.

As will be described in more detail below, the IME 102 can make handover predictions, make resource pre-allocation decisions, and execute resource pre-allocations. In making the resource pre-allocation decisions, the IME 102 can determine various current and predicted factors, assess them in accordance with predetermined or dynamically generated policies, and make corresponding pre-allocation decisions for one or more user devices.

The above description of the environment 100 and the various systems, networks, devices, and components therein is intended as a broad, non-limiting overview of an example environment in which various embodiments of the presently disclosed technology may be implemented. FIG. 1 illustrates just one example of an operating environment, and the various embodiments discussed herein are not limited to such environments. In particular, the environment 100 may contain other devices, systems and/or media not specifically described herein.

Figure 2:
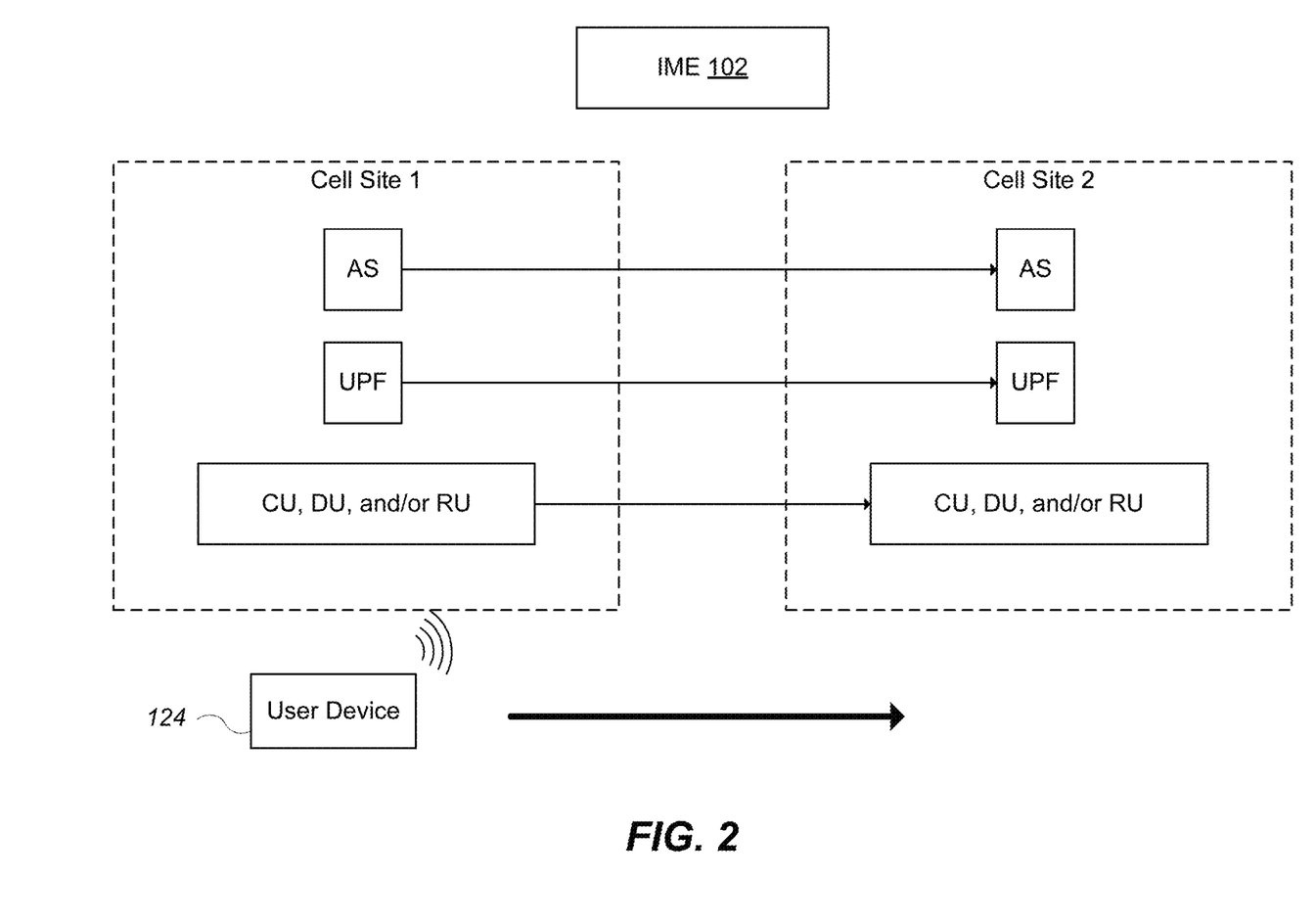
FIG. 2 illustrates an example of a handover situation in accordance with embodiments described herein.

FIG. 2 illustrates an example of a handover situation in accordance with embodiments described herein. As illustrated, a user device 124 is moving away from cell site 1 and moving toward cell site 2. The IME 102 facilitates the handover where an AS is located at the edge (e.g., at the cell site or very close to the cell site) in order to provide low latency service to the user device (URLLC) or to handle highly confidential data that cannot leave a site location. When the user device moves from one site to the next, the IME 102 facilitates handover in the RAN (e.g., via change of CU, DU, and/or RU), in the UPF, and in the application (e.g., via change of AS). The AS in FIG. 2 can include multiple components. For instance it can include an edge application and an edge platform (as in MEC).

Figure 3:
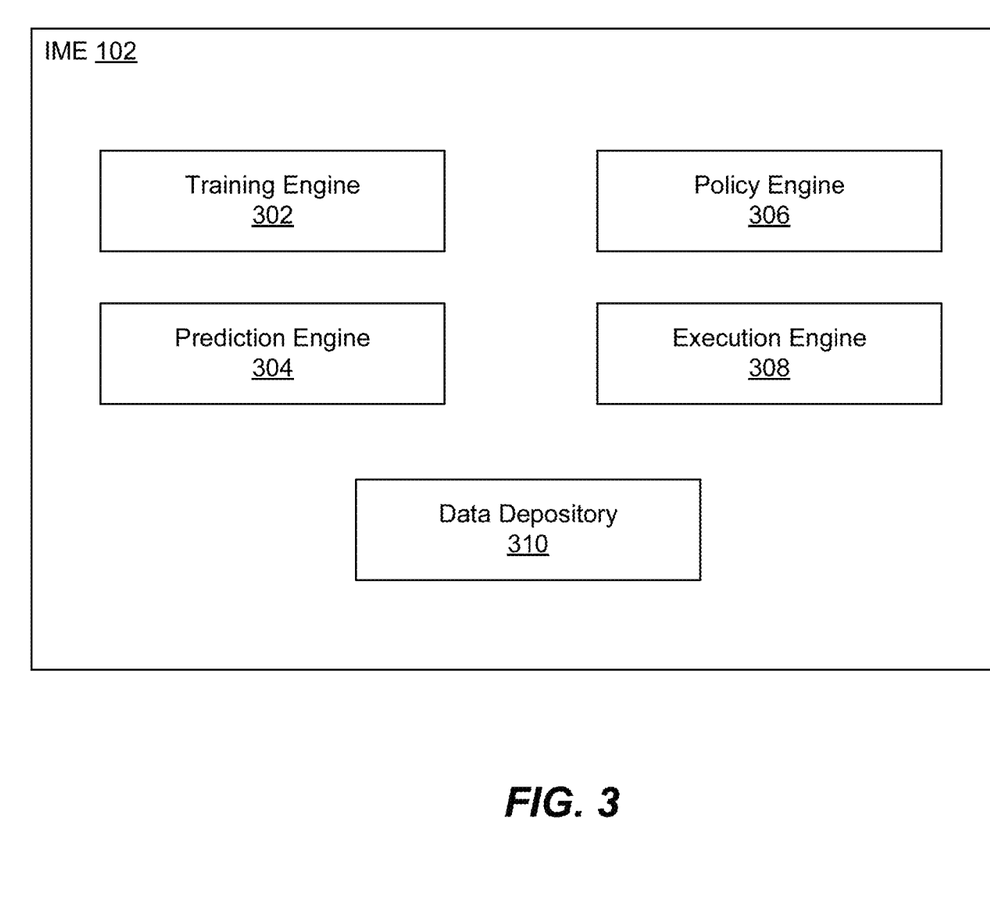
FIG. 3 is a block diagram of a non-limiting example of components of the IME 102 in accordance with embodiments described herein.

FIG. 3 is a block diagram of a non-limiting example of components of the IME 102 in accordance with embodiments described herein. Illustratively, the IME 102 gathers input from the communication network 110 for observing user devices as they move around. The historical information is stored in the data repository 310. This data can later be used by the training engine 302 to build machine learning or other AI models (e.g., artificial neural networks, support vector machines, hierarchical statistical models, or the like) that can be used to perform inference.

The training engine 302 can do this by analyzing past events to enable or improve the handover predictions by the prediction engine 304. It can also analyze quality of service data, to build other models for resource pre-allocation that can better decide if the cost of an early handover resource allocation is justified.

As discussed above, IP session continuity could be maintained using 3GPP mechanisms which would increase latency requirements. It could also be maintained by using advanced routing mechanisms to move the IP address to a new UPF. The sequence of actions that need to be taken to move the session is defined in a workflow that can be executed by the execution engine 308. This involves triggering some standard handover mechanisms, it can involve moving state information from one AS to another, it can involve triggering some proprietary mechanisms in the application, it involve advertising a different set of IP addresses from a UPF, or it can involve other mechanisms.

The exact workflow to be executed is decided by the IME 102, controlled by the policy engine 306 and triggered by the prediction engine 304. Application session continuity can be maintained, e.g., by having the application servers store all state information in a common repository that all AS share. That repository may be a distributed database so that the same information can be made available in multiple sites. Alternatively or in addition, it can include a central data lake and repository.

Figure 4:
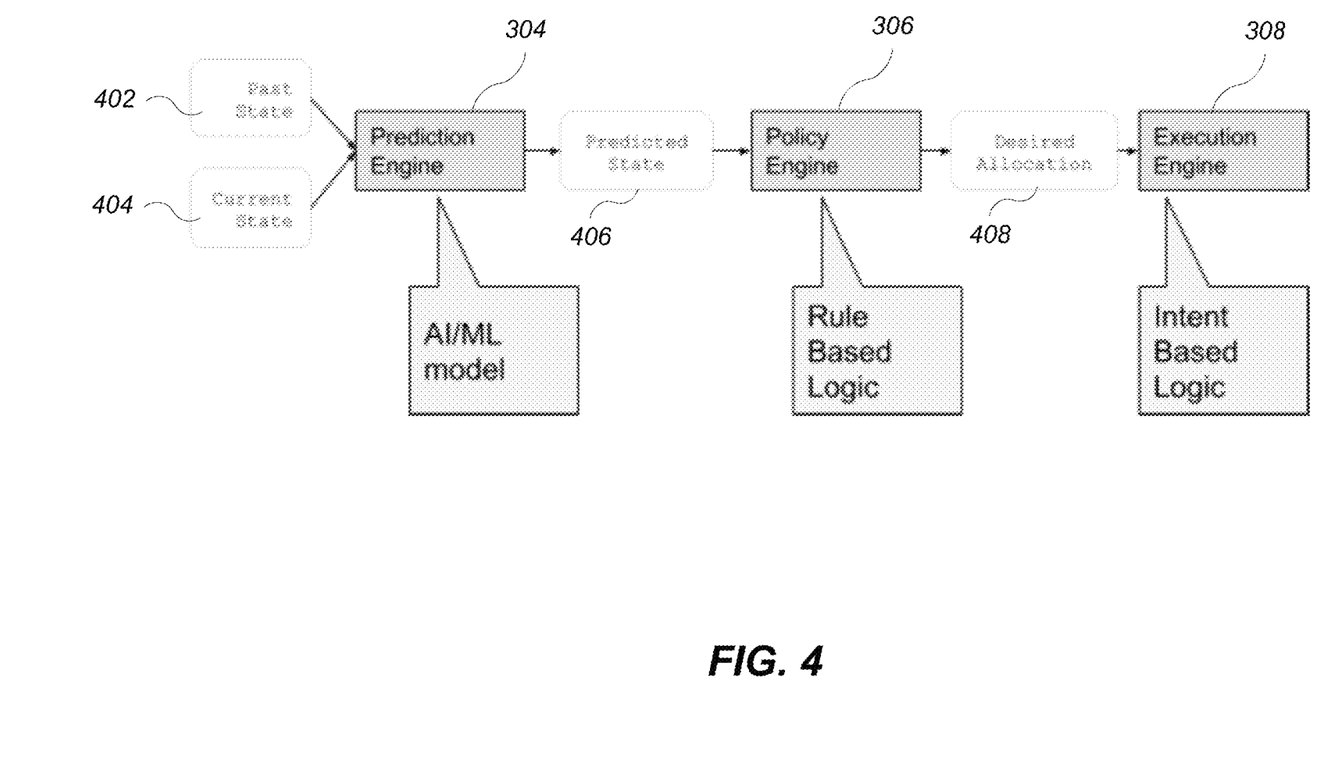
FIG. 4 is a flow diagram of a non-limiting, overview example of functions performed by certain components of the IME in accordance with embodiments described herein.

FIG. 4 is a flow diagram of a non-limiting, overview example of functions performed by certain components of the IME 102 in accordance with embodiments described herein. The prediction engine 304 can receive data corresponding to past state 402 and current state 404 of the communication network 110 (e.g., including monitored travel patterns of user devices and associated handovers, quality of service metrics, cell resource utilization, or the like), and use trained machine learning or other AI model(s) to output predicted state 406 of the communication network 110 (e.g., including estimated travel patterns of user devices and associated handovers, estimated quality of service metrics, estimated cell resource utilization, or the like).

Based on the predicted state, the policy engine 306 can weigh the tradeoff between resource allocation for early handover (e.g., having implications associated with using some resources on a target cell) and maintaining or improving quality of service and experience. This tradeoff can be decided based on pre-defined logic, output of other machine learning or AI model(s) trained on past data, combination of the same or the like. The more contextual information is available to the policy engine 306, the more optimal pre-allocation decision 408 can be made based on the tradeoff analysis. Once the desired resource pre-allocation 408 is determined by the policy engine 306, it controls the execution engine 308 to implement corresponding resource configuration, setting, or other utilization in related cells in anticipation of predicted handovers.

Figure 5:
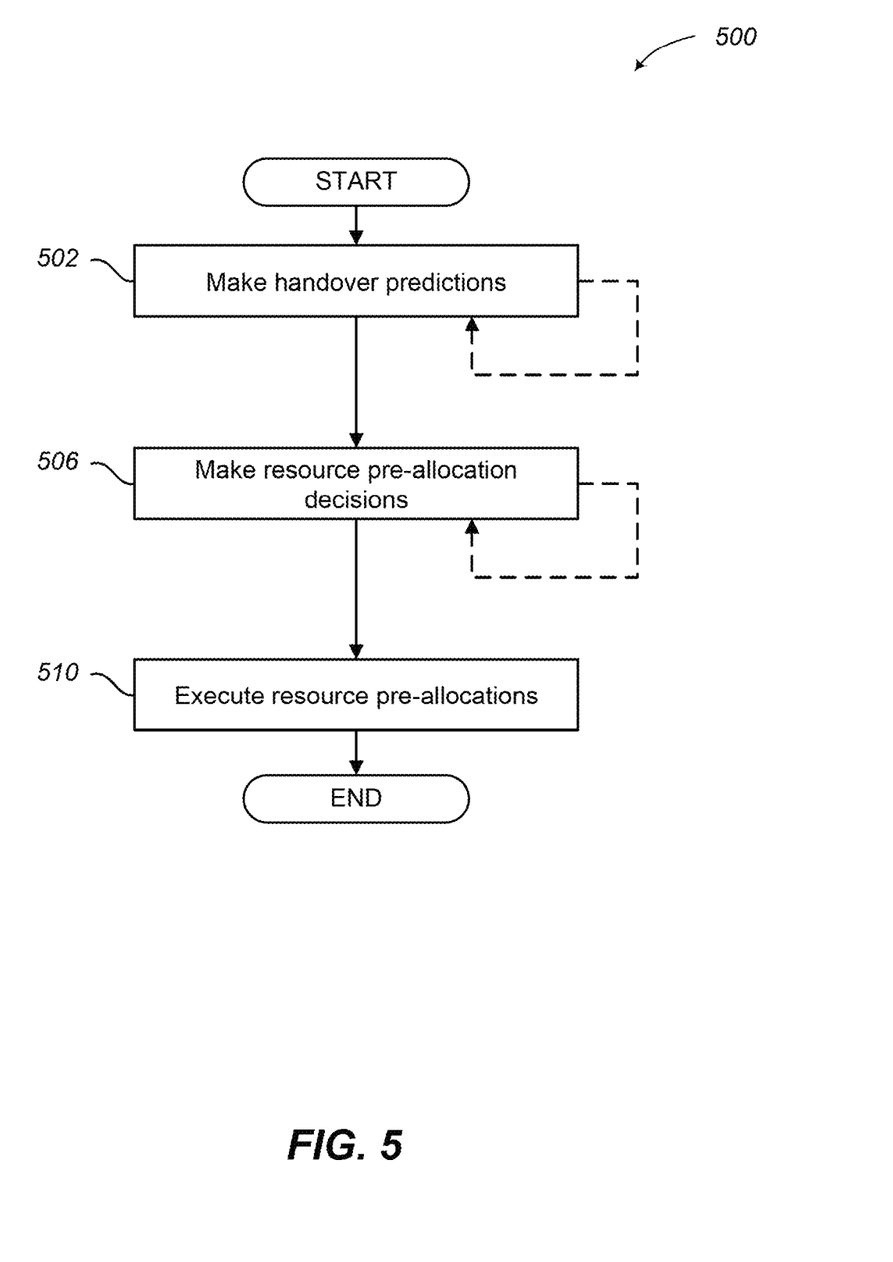
FIG. 5 illustrates a logical flow diagram showing one embodiment of a process for facilitating intelligent mobility in a communication network in accordance with embodiments described herein.

FIG. 5 illustrates a logical flow diagram showing one embodiment of a process 500 for facilitating intelligent mobility in a communication network in accordance with embodiments described herein. The process 500 can be implemented by the IME 102, and in some cases, in conjunction with other components of the environment 100.

The process 500 begins, at block 502, where handover predictions are made by the IME 102. As described above, the IME 102 aggregates the information on the past and current situation of the communication network 110 (e.g., including situation of cells and user devices), and uses trained machine learning or other AI model(s) to make mobility predictions on how the situation will evolve. Illustratively, the predictions can include the estimated time, location, source cell, target cell(s), and confidence level for predicted handovers for individual or groups of user devices. Block 502 can loop back to itself in accordance with a time schedule (e.g., based on pre-defined or dynamically generated time intervals) or as triggered by network events (e.g., significant changes in network traffic or user device travel pattern), so that new or modified predictions are generated to keep updating the basis for resource pre-allocation decisions.

At block 506, the process 500 includes making resource pre-allocation decisions. As described above, the IME 102 makes resource pre-allocation decisions based on the predictions made at block 502, in accordance with user-defined rules or using output from applicable machine learning or other AI model(s). Because the predictions may be changing, the utilization in target cell(s) may increase or decrease, the user device(s) keeps moving closer or not to the target cell(s), the pre-allocation decision can be revised or updated. Similar to block 502, block 506 can loop back to itself in accordance with a time schedule (e.g., based on pre-defined or dynamically generated time intervals) or as triggered by network events (e.g., new allocations of resources in target cell(s)). The revision or updating of pre-allocation decisions can also be used to ensure that pre-allocated resources are cleared if they have not been utilized after a threshold of time (e.g., if user session of a user device was disconnected).

At block 510, the process 500 includes executing resource pre-allocation(s) based, e.g., on most up-to-date pre-allocation decisions. Among other things, state information (e.g., regarding running application(s), Internet status, or other evolving data) associated with the user device(s) involved in the decisions can be transmitted, shared, or synchronized between source cell(s) and target cell(s).

Figure 6:
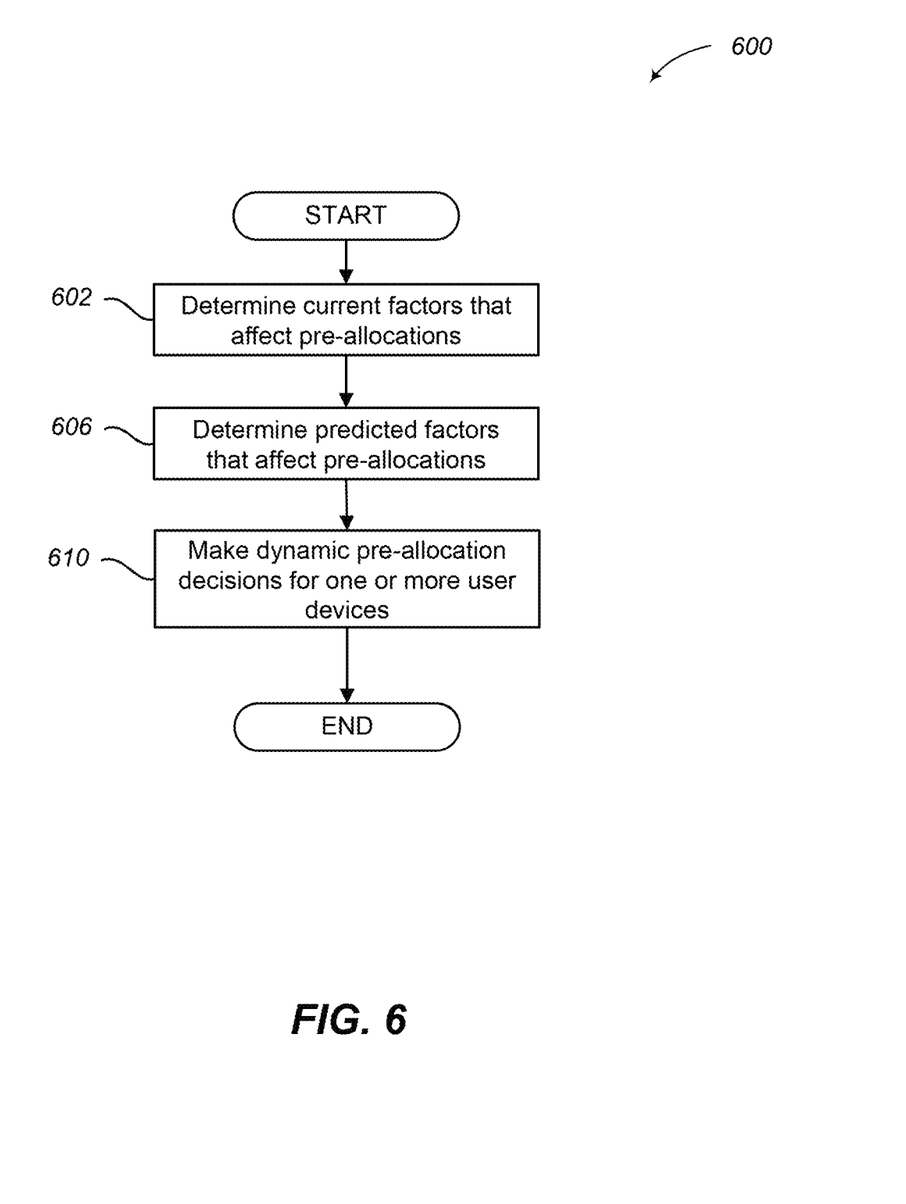
FIG. 6 illustrates a logical flow diagram showing one embodiment of a process for making resource pre-allocation decisions in accordance with embodiments described herein.

FIG. 6 illustrates a logical flow diagram showing one embodiment of a process 600 for making resource pre-allocation decisions in accordance with embodiments described herein. The process 600 can be implemented by the IME 102, and in some cases, in conjunction with other components of the environment 100.

The process 600 begins, at block 602, where current factors that affect pre-allocation decisions are determined. The current factors can include any currently measurable (or otherwise readily available) metric or status regarding the communication network 110 (including that of the cells or user devices). Illustratively, the current factors can include currently measured communication network metrics (e.g., current resource utilization in various cells including the use of processor, memory, wave bandwidth, or power consumption; current number and type of user devices served by different cells; current network performance including latency, packet drop rate, or communication quality; current resource utilization by AS and Edge platform; etc.). The current factors can include user device's priority (e.g., different tiers of wireless plans), computational capability (e.g., the configuration and utilization of user device resources), communication capability (e.g., type of wireless communication interface), or the like that are currently associated with individual or groups of user devices.

At block 604, the process 600 includes determining predicted factors that affect pre-allocation decisions. The predicted factors can include any predicted activity, metric, or status regarding the communication network 110 (including that of the cells or user devices). Illustratively, the predicted factors can include handover predictions for individual or groups of user devices (e.g., the estimated time, location, source cell, target cell(s), and confidence level associated with predicted handovers). The predicted factors can include predicted communication network metrics (e.g., predicted resource utilization in various cells including the use of processor, memory, wave bandwidth, or power consumption; predicted resource utilization by AS and MEC platform serving users in that cell; predicted number and type of user devices served by different cells; predicted network performance including latency, packet drop rate, or communication quality; etc.). The predicted factors can be generated using one or more machine learning models or other AI techniques, based on past, current, and/or predicted data. For example, a predicted handover can be a partial basis for determining corresponding predicted change in resource utilization of source or target cells related to the predicted handover.

At block 606, the process 600 includes making dynamic pre-allocation decisions for one or more user devices based on the current and/or predicted factors. The IME 102 can analyze the current and/or predicted factors in accordance with various user-defined rules or based on output from applicable machine learning or other AI models for resource pre-allocation. The user-defined rules or pre-allocation models can take into account certain selected subset of the current and/or predicted factors, determine a tradeoff between the pre-allocation cost and quality of service gain, and make optimized resource pre-allocation decisions in accordance with the tradeoff determination.

In some embodiments, the decision is based on the situation of individual user devices. Illustratively, the IME 102 can individually assess the situation of user devices that have a high priority (e.g., subscribing to a certain category of wireless plan, running a certain type of application, having critical communication requirements, etc.) and use rules or models to make related resource pre-allocation decisions including determining available resources in neighboring cells of the user device and allocating some of those resources for handoff preparation.

Figure 8:
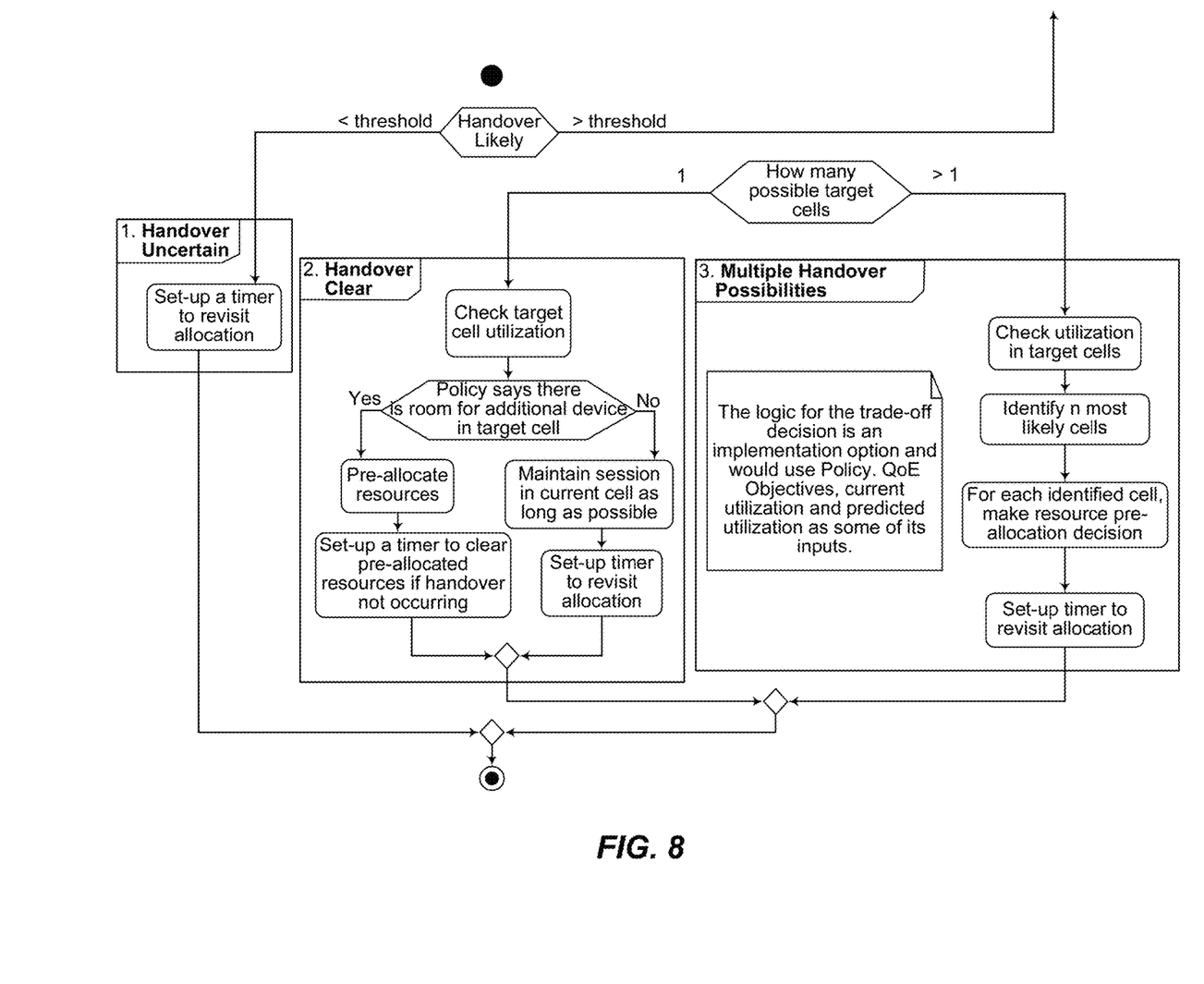
FIG. 8 illustrates an example process of making resource pre-allocation decisions for individual user devices in accordance with some embodiments of the techniques described herein.

FIG. 8 illustrates an example process of making resource pre-allocation decisions for individual user devices in accordance with some embodiments. Here, the nature and level of certainty of the predicted handover for individual user devices are assessed. For example, the IME 102 can determine a threshold of the confidence level associated with a predicted handover, based on the tradeoff between the expected pre-allocation cost and the expected quality of service gain for the communication network 110. The IME 102 proceeds with pre-allocation decisions for predicted handovers for individual user devices that are relatively certain (e.g., having a confidence level above the threshold) and does not act for those that are relatively uncertain (e.g., having a confidence level below the threshold). Alternatively or in addition, the determination of the threshold can take into account individual user device's priority or desired user quality of experience. In certain cases, there may be multiple possible receiving cells for a predicted handover that each has a confidence level above the threshold to warrant a pre-allocation decision. In that case, the IME 102 can decide to pre-allocate resources in some or all of the possible receiving cells. For example, the IME 102 can sort the possible receiving cells based on their associated confidence levels and proceed with pre-allocation decisions for a threshold number of top ranked receiving cells.

In some embodiments, the pre-allocation decision is based on the situation of user device groups. Illustratively, the IME 102 can make pre-allocation decisions based on the current and/or predicted situation of one or more groups of user devices (e.g., all user devices in a defined geographic area or sub-network).

In certain cases, a prediction and resource pre-allocation related to one user devices can affect the prediction and resource pre-allocation for another user device or a whole group of user devices including both. For example, for mobile coverage of a busy section of a road, the user devices are located in the cars moving on the road. There is road traffic running in both directions. When making a tradeoff determination for a first user device currently in cell 1 and moving to cell 2, the target cell is the next cell on the road (i.e., cell 2). Individual user device based analysis may decide against a pre-allocation of resources because, e.g., a predicted handover for the first user device has a below-threshold confidence level or the target cell (cell 2) is highly utilized. Similarly, a second user device on the same road moving in the reverse direction from cell 2 towards cell 1, may also be denied resource pre-allocation because, e.g., a predicted handover for the second user device has a below-threshold confidence level or the target cell (cell 1) is highly utilized. However, a tradeoff determination for the group of all user devices located in the road section can include a prediction that if the handovers of the first user device and the second user device occur at roughly the same time (e.g., within threshold time difference), resource pre-allocation would benefit them both (e.g., to justify lower the threshold of handover confidence level and/or to determine that resource utilization would not be exceeded in either cell).

Figure 9:
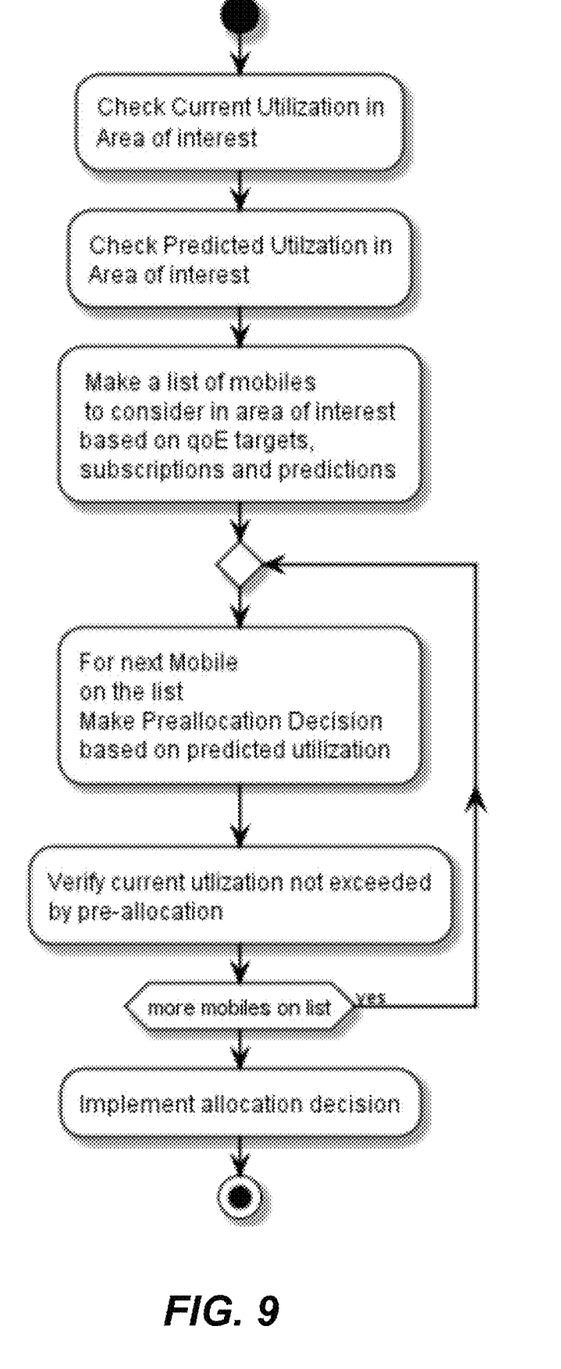
FIG. 9 illustrates an example process of making resource pre-allocation decisions for groups of user devices in accordance with some embodiments of the techniques described herein.

FIG. 9 illustrates an example process of making resource pre-allocation decisions for groups of user devices in accordance with some embodiments. Here, an area of interest (e.g., a set of cells, a geographic area, or a sub-network) can be determined based on user-defined rules, or based on certain machine learning or AI models (e.g., for intelligently segmenting the mobile coverage by the communication network 110). This process can be triggered by events related to all the mobiles within the area of interest. Alternatively or in addition to processing of the list of mobiles as shown in FIG. 9, parallel processing can be employed to batch process group-based decisions.

Those skilled in the art will appreciate that the various operations depicted via FIGS. 5, 6, 8, and 9, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 7:
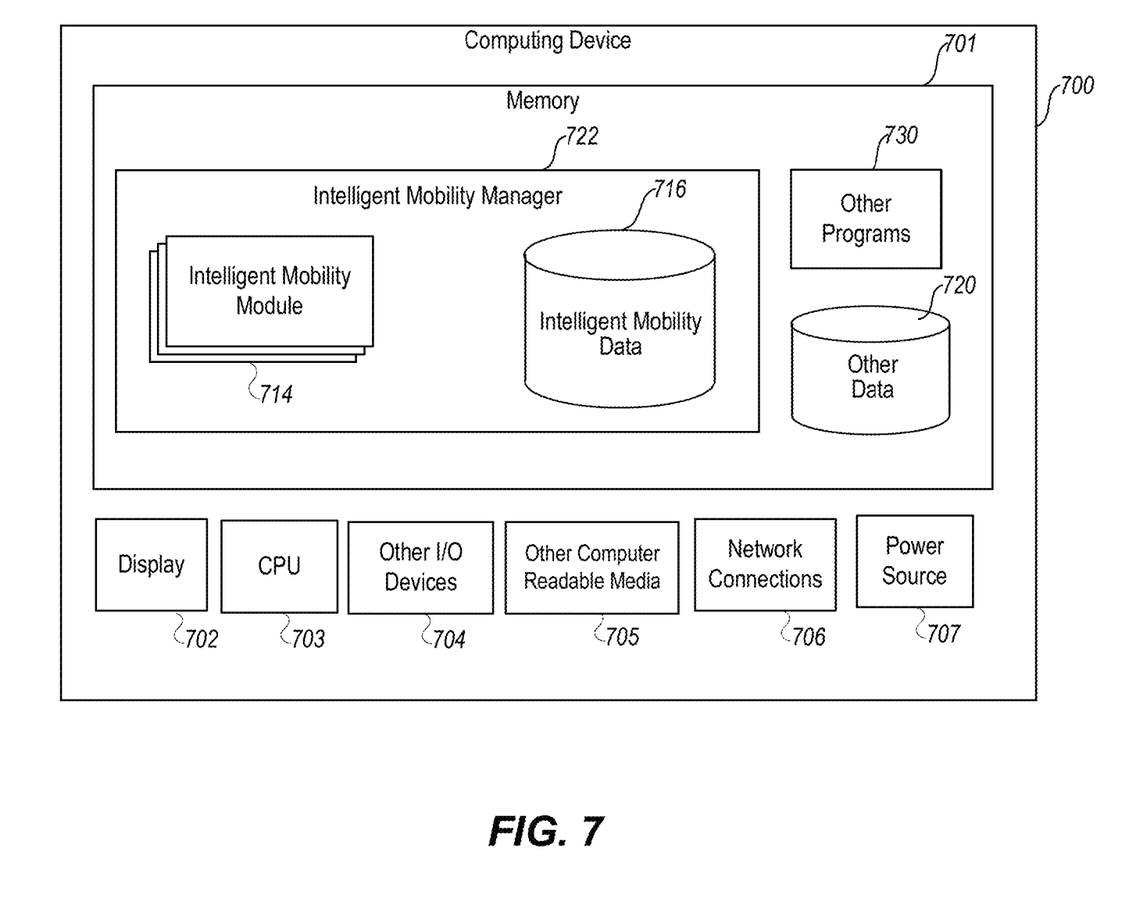
FIG. 7 is a block diagram illustrating elements of an example computing device utilized in accordance with some embodiments of the techniques described herein.

FIG. 7 is a block diagram illustrating elements of an example computing device 700 utilized in accordance with some embodiments of the techniques described herein. Illustratively, the computing device 700 corresponds to an Intelligent Mobility Element 102, a user device 124, a certain device of the communication network 110, or at least a part thereof.

In some embodiments, one or more general purpose or special purpose computing systems or devices may be used to implement the computing device 700. In addition, in some embodiments, the computing device 700 may comprise one or more distinct computing systems or devices, and may span distributed locations. Furthermore, each block shown in FIG. 7 may represent one or more such blocks as appropriate to a specific embodiment or may be combined with other blocks. Also, the intelligent mobility manager 722 may be implemented in software, hardware, firmware, or in some combination to achieve the capabilities described herein.

As shown, the computing device 700 comprises a computer memory ("memory") 701, a display 702 (including, but not limited to a light emitting diode (LED) panel, cathode ray tube (CRT) display, liquid crystal display (LCD), touch screen display, projector, etc.), one or more Central Processing Units ("CPU") 703, Input/Output ("I/O") devices 704 (e.g., keyboard, mouse, RF or infrared receiver, universal serial bus (USB) ports, High-Definition Multimedia Interface (HDMI) ports, other communication ports, and the like), other computer-readable media 705, network connections 706, a power source (or interface to a power source) 707. The intelligent mobility manager 722 is shown residing in memory 701. In other embodiments, some portion of the contents and some, or all, of the components of the intelligent mobility manager 722 may be stored on and/or transmitted over the other computer-readable media 705. The components of the computing device 700 and intelligent mobility manager 722 can execute on one or more CPUs 703 and implement applicable functions described herein. In some embodiments, the intelligent mobility manager 722 may operate as, be part of, or work in conjunction and/or cooperation with other software applications stored in memory 701 or on various other computing devices. In some embodiments, the intelligent mobility manager 722 also facilitates communication with peripheral devices via the I/O devices 704, or with another device or system via the network connections 706.

The one or more intelligent mobility modules 724 is configured to perform actions related, directly or indirectly, to facilitating and managing handover prediction, resource pre-allocation, and other functions as described herein. In some embodiments, individual intelligent mobility module(s) correspond to the training engine 202, prediction engine 204, policy engine 206, and execution engine 208 as illustrated in FIG. 2. The intelligent mobility module(s) 724 stores, retrieves, or otherwise accesses at least some intelligent mobility-related data on some portion of the intelligent mobility data storage 716 or other data storage internal or external to the computing device 700. In various embodiments, at least some of the intelligent mobility modules 724 may be implemented in software or hardware.

Other code or programs 730 (e.g., further data processing modules, a program guide manager module, a Web server, and the like), and potentially other data repositories, such as data repository 720 for storing other data, may also reside in the memory 701, and can execute on one or more CPUs 703. Of note, one or more of the components in FIG. 7 may or may not be present in any specific implementation. For example, some embodiments may not provide other computer readable media 705 or a display 702.

In some embodiments, the computing device 700 and intelligent mobility manager 722 include API(s) that provides programmatic access to add, remove, or change one or more functions of the computing device 700. In some embodiments, components/modules of the computing device 700 and intelligent mobility manager 722 are implemented using standard programming techniques. For example, the intelligent mobility manager 722 may be implemented as an executable running on the CPU 703, along with one or more static or dynamic libraries. In other embodiments, the computing device 700 and intelligent mobility manager 722 may be implemented as instructions processed by a virtual machine that executes as one of the other programs 730. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 700 to perform the functions of the intelligent mobility manager 722. In some embodiments, instructions cause the CPU 703 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a intelligent mobility manager 722 implementation. Also, other functions could be implemented and/or performed by each component/module, and in different orders, and by different components/modules, yet still achieve the functions of the computing device 700 and communication facilitation manager 722.

In addition, programming interfaces to the data stored as part of the computing device 700 and intelligent mobility manager 722, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The intelligent mobility data storage 716 and data repository 720 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the intelligent mobility manager 722.

Furthermore, in some embodiments, some or all of the components of the computing device 700 and intelligent mobility manager 722 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
a memory that stores computer instructions; and
a processor that executes the computer instructions to perform actions, the actions including:
determining a predicted handover, from a source cell to a target cell, for a user device in a packet-based communication session with a cellular network;
predicting at least respective quantities of user devices served by different cells of the cellular network;
analyzing a tradeoff between (a) a cost for pre-allocation of resources in the cellular network prior to implementing the predicted handover and (b) a gain in quality of service associated with the predicted handover, based on predicted status data including the predicted respective quantities of user devices served by different cells of the cellular network; and
during the communication session, allocating the resources in the cellular network prior to implementing the predicted handover based, at least in part, on the analyzing, wherein at least a portion of the resources allocated is used for the target cell to maintain continuity of the communication session while the user device is handed over from the source cell to the target cell.

2. The computing device of claim 1, wherein the analyzing of the tradeoff is further based on current status data of the cellular network.

3. The computing device of claim 1, wherein the predicted status data includes predicted resource utilization in at least one of a cell of the cellular network, an application server, or an edge platform.

4. The computing device of claim 3, wherein the predicted status data is generated based, at least in part, on predicted resource utilization associated with the predicted handover.

5. The computing device of claim 1, wherein determining the predicted handover includes predicting at least one of a time or location the predicted handover.

6. The computing device of claim 1, wherein determining the predicted handover includes associating a confidence level with the predicted handover.

7. The computing device of claim 6, wherein the actions further include determining a threshold applicable to the confidence level based, at least in part, on the analyzing of the tradeoff.

8. The computing device of claim 1, wherein analyzing the tradeoff is further based on at least a second handover predicted for another user device.

9. The computing device of claim 8, wherein the actions further include determining at least the second handover in accordance with an area of interest.

10. The computing device of claim 9, wherein the area of interest includes at least one of a geographic area, a sub-network, or one or more cells.

11. A method, comprising:
obtaining data on predicted handovers, each from a respective source cell to a respective target cell, for a plurality of user devices in respective communication sessions with a communications network;
predicting at least respective quantities of user devices served by different cells of the communications network;
analyzing a tradeoff between (a) a cost for pre-allocation of resources in the communications network prior to executing one or more of the predicted handovers and (b) a gain in quality of service associated with the one or more of the predicted handovers, based on at least a subset of predicted status data including the predicted respective quantities of user devices served by different cells of the communications network; and
during one or more of the communication sessions, allocating the resources in the communications network prior to executing the one or more of the predicted handovers based, at least in part, on the analyzing of the tradeoff, wherein at least a portion of the resources allocated is used for one or more target cells to maintain continuity of the one or more communication sessions during handover of their corresponding user devices.

12. The method of claim 11, further comprising selecting a subset of the predicted handovers for pre-allocation of resources based, at least in part, on the analyzing of the tradeoff.

13. The method of claim 11, wherein the analyzing comprises determining a threshold applicable to confidence levels associated with the predicted handovers.

14. The method of claim 13, wherein the threshold is determined based further on at least one of a priority, computational capability, communication capability, or desired quality of service associated with individual user devices of the plurality of user devices.

15. The method of claim 11, further comprising analyzing the tradeoff in accordance with an area of interest.

16. A non-transitory computer-readable storage medium storing contents that, when executed by one or more processors, cause the one or more processors to:
obtain data on predicted handovers, each from a respective source cell to a respective target cell, for a plurality of user devices in respective communication sessions with a communications network;
predict at least respective quantities of user devices served by different cells of the communications network;
analyze a tradeoff between (a) a cost for pre-allocation of resources in the communications network prior to implementing one or more of the predicted handovers and (b) a gain in quality of service associated with the one or more of the predicted handovers, based on at least a subset of predicted status data including the predicted respective quantities of user devices served by different cells of the communications network; and
during at least one of the communication sessions, allocate the resources in the communications network prior to implementing the one or more of the predicted handovers based, at least in part, on the analyzing of the tradeoff, wherein at least a portion of the resources allocated is used for at least one target cell to maintain continuity of the at least one communication session during handover of at least one the user devices.

17. The computer-readable storage medium of claim 16, wherein the contents further cause the one or more processors to select a subset of the predicted handovers for pre-allocation of resources based, at least in part, on the analyzing of the tradeoff.

18. The computer-readable storage medium of claim 16, wherein the analyzing of the tradeoff comprises determining a threshold applicable to confidence levels associated with the predicted handovers.

19. The computer-readable storage medium of claim 18, wherein the threshold is determined based further on at least one of a priority, computational capability, communication capability, or desired quality of service associated with individual user devices of the plurality of user devices.

20. The computer-readable storage medium of claim 16, wherein the contents further cause the one or more processors to analyze the tradeoff in accordance with an area of interest.

* * * * *

UNITED STATES PATENT AND TRADEMARK OFFICE
CERTIFICATE OF CORRECTION

PATENT NO. : 12,167,503 B2
APPLICATION NO. : 18/463594
DATED : December 10, 2024
INVENTOR(S) : Paul-Andre Raymond

Page 1 of 1

It is certified that error appears in the above-identified patent and that said Letters Patent is hereby corrected as shown below:

In the Claims

<u>Column 14, Claim 16, Line 25:</u>
"of at least one the user devices." should read: --of at least one of the user devices.--

Signed and Sealed this
Eighteenth Day of February, 2025

Coke Morgan Stewart
*Acting Director of the United States Patent and Trademark Office*